(12) United States Patent
Schoenleber et al.

(10) Patent No.: US 9,770,783 B2
(45) Date of Patent: Sep. 26, 2017

(54) METHOD FOR MEASURING THE DISTANCE BETWEEN A WORKPIECE AND A MACHINING HEAD OF A LASER MACHINING APPARATUS

(71) Applicant: Precitec Optronik GmbH, Neu-Isenburg (DE)

(72) Inventors: Martin Schoenleber, Aschaffenburg (DE); Markus Kogel-Hollacher, Haibach (DE); Thibault Bautze, Karlsruhe (DE)

(73) Assignee: PRECITEC OPTRONIK GMBH, Neu-Isenberg (DE)

( * ) Notice: Subject to any disclaimer, the term of this patent is extended or adjusted under 35 U.S.C. 154(b) by 214 days.

(21) Appl. No.: 14/814,892

(22) Filed: Jul. 31, 2015

(65) Prior Publication Data
US 2016/0059350 A1 Mar. 3, 2016

(30) Foreign Application Priority Data
Aug. 2, 2014 (DE) .......................... 10 2014 011 569

(51) Int. Cl.
*B23K 26/08* (2014.01)
*B23K 26/04* (2014.01)
(Continued)

(52) U.S. Cl.
CPC .......... *B23K 26/0892* (2013.01); *B23K 26/04* (2013.01); *B23K 26/048* (2013.01);
(Continued)

(58) Field of Classification Search
CPC ......... B23K 26/08; B23K 26/04; G01B 11/14
(Continued)

(56) References Cited

U.S. PATENT DOCUMENTS 5,141,318 A * 8/1992 Miyazaki ........... G01B 9/02049
250/548
6,337,488 B1 * 1/2002 Okawauchi ........ G01N 21/9501
250/336.2

(Continued)

FOREIGN PATENT DOCUMENTS

DE 102010016862 9/2011
DE 102012207835 11/2012
(Continued)

*Primary Examiner* — Samuel M Heinrich
(74) *Attorney, Agent, or Firm* — Lempia Sutherland Katz LLC (57) ABSTRACT

According to a method for measuring the distance between a workpiece and a machining head of a laser machining apparatus, a machining head is provided, which has a housing that has an interior and an opening for emergence of the laser radiation from the machining head. The laser radiation is directed on to the workpiece, after it has passed through the interior and the opening. An object beam is directed on to the workpiece by a light source of an optical coherence tomograph in such a manner that the object beam passes through the interior and the opening before being incident upon the workpiece. In addition to the object beam, a measuring beam passes through the interior. The measuring beam is used to compensate falsifications of the measured distance that have been caused by pressure fluctuations in the interior. The measuring beam in this case may be reflected at a reflective face that is formed on an inner face of an outlet nozzle that comprises the opening, which inner face delimits the interior.

15 Claims, 6 Drawing Sheets

(51) Int. Cl.
*G01B 11/14* (2006.01)
*G01B 9/02* (2006.01)

(52) U.S. Cl.
CPC ...... *B23K 26/0884* (2013.01); *G01B 9/02091* (2013.01); *G01B 11/14* (2013.01)

(58) Field of Classification Search
USPC ............ 219/121.62, 121.73, 121.78, 121.82; 250/492.1; 356/498
See application file for complete search history.

(56) References Cited

U.S. PATENT DOCUMENTS

| | | | |
|---|---|---|---|
| 6,616,898 B2 * | 9/2003 | Terashima | G05D 16/2013 118/715 |
| 8,410,392 B2 | 4/2013 | Kogel-Hollacher et al. | |
| 8,416,422 B2 * | 4/2013 | Sasaki | G01B 11/02 356/498 |
| 8,982,339 B2 | 3/2015 | Schonleber et al. | |
| 2002/0148961 A1 * | 10/2002 | Nakasuji | G01N 23/225 250/311 |

FOREIGN PATENT DOCUMENTS

| | | |
|---|---|---|
| EP | 1977850 | 10/2008 |
| WO | WO2014138939 | 9/2014 |

* cited by examiner

METHOD FOR MEASURING THE DISTANCE BETWEEN A WORKPIECE AND A MACHINING HEAD OF A LASER MACHINING APPARATUS

BACKGROUND OF THE INVENTION

1. Field of the Invention

The invention relates to a method for measuring the distance between a workpiece and a machining head of a laser machining apparatus by means of which workpieces can be welded, cut or otherwise machined.

2. Description of the Prior Art

Laser machining apparatus usually comprise a laser radiation source, which may be, for example, a $CO_2$ laser, a fibre laser or a disc laser. A laser machining apparatus additionally includes a machining head, which focuses the laser radiation, generated by the laser radiation source, in a focal spot, and a beam delivery means, which delivers the laser radiation, generated by the laser radiation source, to the machining head. The beam delivery means in this case may comprise optical fibres or other optical waveguides, and/or one or more deflecting mirrors having planar or curved faces. The machining head may be attached to a movable robot arm or to another positioning device that enables three-dimensional positioning. The laser radiation source in this case is frequently disposed at a greater distance from the machining head or from a positioning device carrying the machining head.

Usually, the workpieces to be machined are positioned in relation to the machining head by means of handling devices. By means of the robot, the machining head is then guided over the stationary workpiece, at a distance of a few millimeters. At the same time, process gas flows out of the machining head, which process gas, depending on the machining operation, reacts chemically with the material or merely performs the function of removing residues, produced during the machining operation, from the machining site.

In the use of such laser machining apparatus, it is difficult to position the focal spot in an exact manner on the surface of the workpieces to be machined, the diameter of which focal spot is usually between 100 μm and 500 μm in the case of welding work, and may be 20 μm and less in the case of cutting work. It is ideal if the focal spot is tracked in a process of feedback control of the actually existing spatial arrangement of the workpieces. For this purpose, the actual spatial arrangement of the workpieces to be machined, relative to the machining head or to another reference point, is measured in real time during the laser machining operation.

For the measurement, the machining location, for example, can be observed by means of a camera, which captures a 2D projection of the workpieces. However, if the beam path of the camera is coaxial with the laser radiation, as is known in the prior art, only a lateral offset, along the X and Y directions, can be measured with precision, but not the distance of the workpiece in relation to the machining head, along the Z direction. A high process quality requires measuring accuracies in the Z direction that are in the order of magnitude of about 400 μm for welding work and in the order of magnitude of about 100 μm for cutting work.

Further known measuring methods are light-section methods and triangulation methods. Capacitive sensors are also used, especially for distance measurement, insofar as the workpieces have a sufficiently high electrical conductivity.

In addition, the use of optical coherence tomographs, OCT, was also proposed some time ago, for the purpose of measuring distance during laser machining, cf., in particular, EP 1 977 850 B1, DE 10 2010 016 862 B3 and DE 10 2012 207 835 A1. Optical coherence tomography makes it possible to effect highly precise measurement of distance, and even to generate a 3D profile of the scanned surfaces if the measuring beam is guided over the surfaces in the manner of a scanner. Moreover, unlike capacitive sensors, coherence tomographs allow the distances in relation to non-metallic materials, such as fibre-reinforced plastics, to be measured.

It has been found, however, that the measurement of distance by means of coherence tomographs, which is highly promising per se, does not deliver reliable measurement results under all conditions.

SUMMARY OF THE INVENTION

It is an object of the invention to specify a method for measuring the distance between a workpiece and a machining head of a laser machining apparatus, by which the distances can be measured in a particularly reliable and precise manner. It is additionally an object of the invention to specify a machining head that is suitable for executing the method.

In respect of the method, the object is achieved, according to the invention, by a method having the following steps:
a) providing a machining head comprising a housing that has an interior and an opening for emergence of the laser radiation from the machining head,
b) directing the laser radiation on to the workpiece, after the laser radiation has passed through the interior and the opening;
c) generating an object beam by means of a light source of an optical coherence tomograph, and directing the object beam on to the workpiece in such a manner that the object beam passes through the interior and the opening before being incident upon the workpiece;
d) capturing the reflection of the object beam reflected from the workpiece;
e) superimposition the reflection of the object beam with a reference beam generated by the light source of the coherence tomograph;
f) determining the distance between the machining head and the workpiece from an interference signal obtained by the superimposition in step e);
wherein, according to the invention, in addition to the object beam, a measuring beam passes through the interior, which measuring beam is used to compensate falsifications of the measured distance that have been caused by pressure fluctuations in the interior.

The invention is based on the recognition that a cause of imprecise measurement results may be pressure fluctuations in an interior through which there passes, not only the laser radiation, but also the object beam of the coherence tomograph. Usually, a process gas flows through this interior, which process gas is directed on to the machining site via the opening through which the laser radiation and the object beam also emerge from the housing of the machining head. Depending on the nature of the processing and the material being processed, the process gas in this case may react chemically with the workpiece, or merely perform the function of mechanically expelling a melt film, produced by the laser radiation, or vapours.

As a rule, the flow conditions close to the opening and the machining site are complex, and may result in pressure fluctuations, in the order of magnitude of several bar, occurring in the interior through which the object beam passes. Since the refractive index is proportional to the gas pressure, the pressure fluctuations result in corresponding variations in the refractive index distribution in the interior. These variations, in turn, affect the optical path length that is traversed by the object beam in the interior. Since the object beam cannot distinguish whether a change in the optical path length results from a varied distance or from a varied refractive index in the interior, pressure fluctuations in the interior result in apparent variations of distance, and therefore in incorrect measurements.

Since, according to the invention, a measuring beam, in addition to the object beam, passes through the interior, falsifications of the measured distance that have been caused by the described pressure fluctuations in the interior can be compensated. Ideally, the measuring beam passes through the interior close to the object beam, or even on the same light path. It is thereby ensured that the pressure distribution to which the object beam is subjected matches, as far as possible, the pressure distribution that is captured by the measuring beam.

The highly precise distance values may be used, for example, to keep the distance between the machining head and the workpiece to a specified value, by way of a feedback control. Additionally or alternatively, a feedback control of the position of the focal spot of the laser radiation may be effected by means of focussing optics arranged in the machining head, using the measured distances.

In the case of one embodiment, the measuring beam is reflected at a reflective face that is realized on an inner face of a housing of the machining head that delimits the interior. The measuring beam thereby passes twice through the interior, with the result that a greater measuring accuracy is achieved. Moreover, in this way, sensitive optical components required for evaluating the measuring beam can be arranged at a greater distance from the end of the machining head that faces towards the workpiece and that is subjected to high thermal and mechanical loads.

In particular, it is a possibility for the measuring beam that is incident upon the reflective face to be reflected back into itself. In this way, the measuring beam can enter the interior and, after being reflected at the reflective face, emerge again from the interior via the same optics.

It is particularly advantageous if the reflective face is in immediate proximity to the opening. It is thereby ensured that even pressure fluctuations in direct proximity to the opening are taken into account by the measuring beam.

In the case of one embodiment, the reflective face is realized on the inner face of an outlet nozzle that comprises the opening. During the measurement of the distance, the already mentioned pressurized gas emerges from the opening, in addition to the laser radiation and the object beam.

In principle, the measuring beam may be generated by any optical measuring device by which pressure fluctuations in a gas-filled interior can be measured. Such measuring devices are known per se in the prior art, and generally use the principle of interferometry to capture optical differences in path length. In particular, heterodyne or multi-wavelength interferometers are suitable.

Since, with the coherence tomograph, there is an interferometric measuring device present in the machining head in any case, the measuring beam is preferably likewise generated by the light source of the coherence tomograph, and a reflection of the measuring beam is overlaid with another beam generated by the light source. In this way, the coherence tomograph that is already present in any case is also used to capture the pressure fluctuations in the interior.

The other beam generated by the light source may be the reference beam or the object beam.

Fluctuations of the optical path length of the measuring beam, caused by pressure fluctuations, can then be determined from the superimposition of the measuring beam with the other beam. These fluctuations of the optical path length can then ultimately be taken into account in determining the distance in step f).

A spatially determined pressure in the interior can also be determined from the superimposition of the measuring beam with the reference beam. The determined pressure values can be used, for example, to control a pressure source that builds up a gas pressure in the interior.

It is easiest if the measuring beam is branched off from the object beam. The measuring beam then to a certain extent constitutes a second object beam, which, however, is directed, not on to the workpiece, but on to a stationary reflective face of the machining head. The branching-off may be effected by means of a beam splitter of any type. In the most simple case, the branching-off is effected in such a manner that an optical element such as, for example, a mirror or a refractive element is arranged in the beam path of the object light such that two differing light paths are produced.

In the case of another embodiment, the measuring beam is the reference beam of the coherence tomograph. A pressure fluctuation in the interior then always simultaneously causes a variation in the optical path length in the reference beam and in the object beam. If the two beams traverse a sufficiently similar beam path through the interior, pressure fluctuations are compensated automatically, because equal path length changes in the reference arm and in the object arm of the coherence tomograph do not affect the interference phenomena that are captured by the coherence tomograph. In the case of this automatic compensation, therefore, the changes in the optical path length are not, strictly speaking, captured metrologically at all, but are "only" compensated automatically. For this reason, with such an arrangement, it is also not possible to make any quantitative statements concerning the pressure fluctuations in the interior.

It is generally preferred if the object beam covers a region on the workpiece that is at a distance from a machining location, at which the laser radiation is incident upon the workpiece. It is thereby ensured that the object beam is always incident upon a surface of the workpiece that is still intact or that has already cooled, and not, for instance, upon a vapour capillary or mobile molten material.

The region covered by the object beam may, in particular, surround the machining location, at least approximately, in the manner of a ring. In this way, meaningful distance values can be obtained for all traversing directions of the machining head relative to the workpiece.

It may additionally be advantageous if a plurality of object beams are directed, independently of each other, on to differing regions of the workpiece. It can thereby be ensured, e.g. in the case of laser cutting, that at least one measurement point is located outside of the kerf. Moreover, with three or more measurement points, an inclination of the workpiece can be captured.

If at least one of the plurality of object beams is incident upon the workpiece coaxially with the laser radiation, the distance of the machining site from the machining head can be measured. In this way, in the case of cutting work, the current cut-in depth can be measured at the start of the cutting operation. As soon as the parting operation has been completed, the machining head can be moved relative to the workpiece, in order to produce a cutting edge.

On the machining head, a reflective face, designed to reflect the measuring beam, may be provided on the inner face of the housing.

In particular, the reflective face may be oriented such that the measuring beam incident upon the reflective face is reflected back into itself.

Preferably, the reflective face is located in immediate proximity to the opening.

In respect of the machining head, the object stated at the outset is achieved by a machining head for a laser machining apparatus that is designed for machining a workpiece by means of laser radiation. The machining head has a housing, which has an inner face, delimiting an interior of the machining head, and an opening for emergence of the laser radiation from the machining head. The interior and the opening are realized such that, during the operation of the laser machining apparatus, the laser radiation passes through the interior, emerges from the opening and is incident upon the workpiece. The machining head additionally has an optical coherence tomograph, which is designed to measure the distance between the machining head and the workpiece during the laser machining operation, an object beam of the coherence tomograph likewise passing through the interior, emerging from the opening and being incident upon the workpiece during a measurement. According to the invention, a measuring means is provided, which is designed to generate a measuring beam, which, in addition to the object beam, passes through the interior and which is used to compensate falsifications of the measured distance that have been caused by pressure fluctuations in the interior.

In the case of one embodiment, the reflective face is realized on the inner face of an outlet nozzle that comprises the opening. The interior has an inlet opening for a pressurized gas, which, in addition to the laser radiation and the object beam, emerges from the opening during the measurement of the distance.

The measuring means may be the coherence tomograph. In this case, the measuring beam can be generated by a light source of the coherence tomograph. The coherence tomograph has a detector, which is designed to detect a superimposition of a reflection of the measuring beam with another beam generated by the light source, for example a further object beam or the reference beam.

The measuring means may have a computing unit, which is designed to determine, from the superimposition of the measuring beam with the other beam, fluctuations of the optical path length of the measuring beam that have been caused by pressure fluctuations. These fluctuations of the optical path length can then be taken into account by the computing unit in determining the distance.

The computing unit may additionally be designed to determine, from the superimposition of the measuring beam with the other beam, a spatially averaged pressure in the interior.

In the case of one embodiment, the measuring beam is branched off from the object beam.

In the case of another embodiment, the measuring beam is the reference beam of the coherence tomograph.

The object beam may cover a region on the workpiece that is at a distance from a machining location at which the laser radiation is incident on the workpiece. This region may surround the machining location, at least approximately, in the form of a ring.

The measuring means may also be designed to direct a plurality of object beams on to differing regions on the workpiece. In this case, at least one of the plurality of object beams may be incident upon the workpiece coaxially with the laser radiation.

BRIEF DESCRIPTION OF THE DRAWINGS

Further features and advantages of the invention are disclosed by the following description of the embodiments, on the basis of the drawings. There are shown in.

DESCRIPTION OF PREFERRED EMBODIMENTS

1. Structure of the Laser Machining Apparatus

Figure 1:
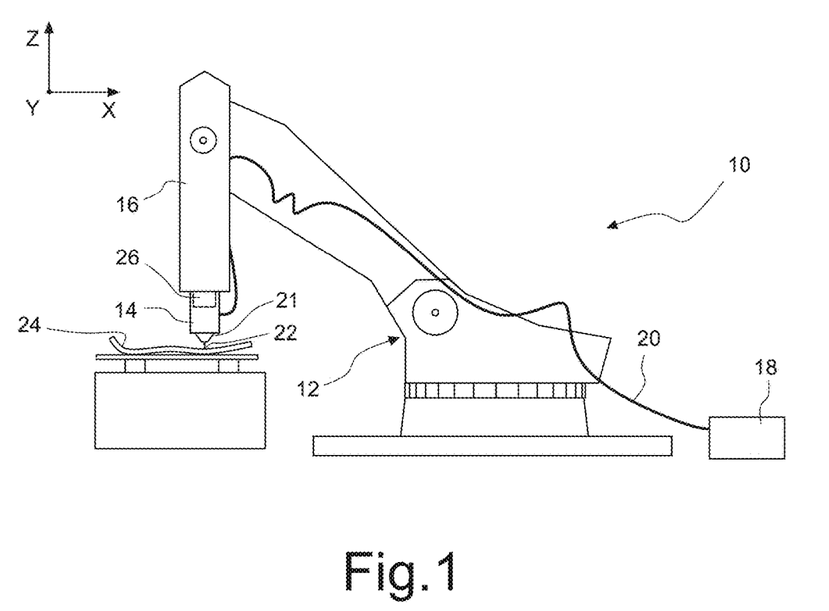
FIG. 1 a schematic representation of a laser machining apparatus according to the invention, which is provided for cutting panels from fibre-reinforced plastic.

FIG. 1, in a schematic representation, shows a laser machining apparatus 10, having a robot 12, and having a machining head 14 according to the invention, which is attached to a movable arm 16 of the robot 12.

The laser machining apparatus 10 additionally includes a laser beam source 18, which, in the embodiment represented, is realized as a disc laser. Such lasers generate laser radiation having a wavelength in the order of magnitude of 1 μm. By means of an optical fibre 20, laser radiation 21 generated by the laser beam source 18 is supplied to the machining head 14, and is focussed by the latter in a focal spot 22 for the purpose of machining a workpiece 24.

The workpiece 24, which, in the embodiment represented, is to be cut by the laser machining apparatus 10, is a curved panel of a fibre-reinforced plastic. These are composed of an organic matrix, which is reinforced either with carbon fibres (carbon-fibre plastics) or with glass fibres (glass-fibre plastics). Such panels may be used, for example, to produce particularly light automobile body shells. In principle, such panels can also be welded to each other or to metals. In the following, it is assumed that the workpiece 24 is to be cut by means of the laser machining apparatus 10.

In the case of cutting, the distance between the focal spot 22 and the machining head 14 is usually only a few millimeters. As explained further below with reference to FIG. 2, the focal length of focussing optics contained in the machining head 14 is variable, to enable the focal spot 22 to be moved in the Z direction in relation to the machining head, and thereby to enable it to be tracked rapidly upon variations in the distance between the machining head 14 and the workpiece 24. It is only when the focal spot 22 has been optimally positioned in relation to the workpiece 24 that the workpiece 24 is cut through without edge damage.

To ensure that the focal spot 22 is always optimally positioned in relation to the workpiece 24, the machining head 14 has an integrated optical coherence tomograph 26, which continuously measures the distance between the machining head 14 and the workpiece 24, in proximity to the focal spot 22.

2. Structure of the Machining Head

Figure 2:
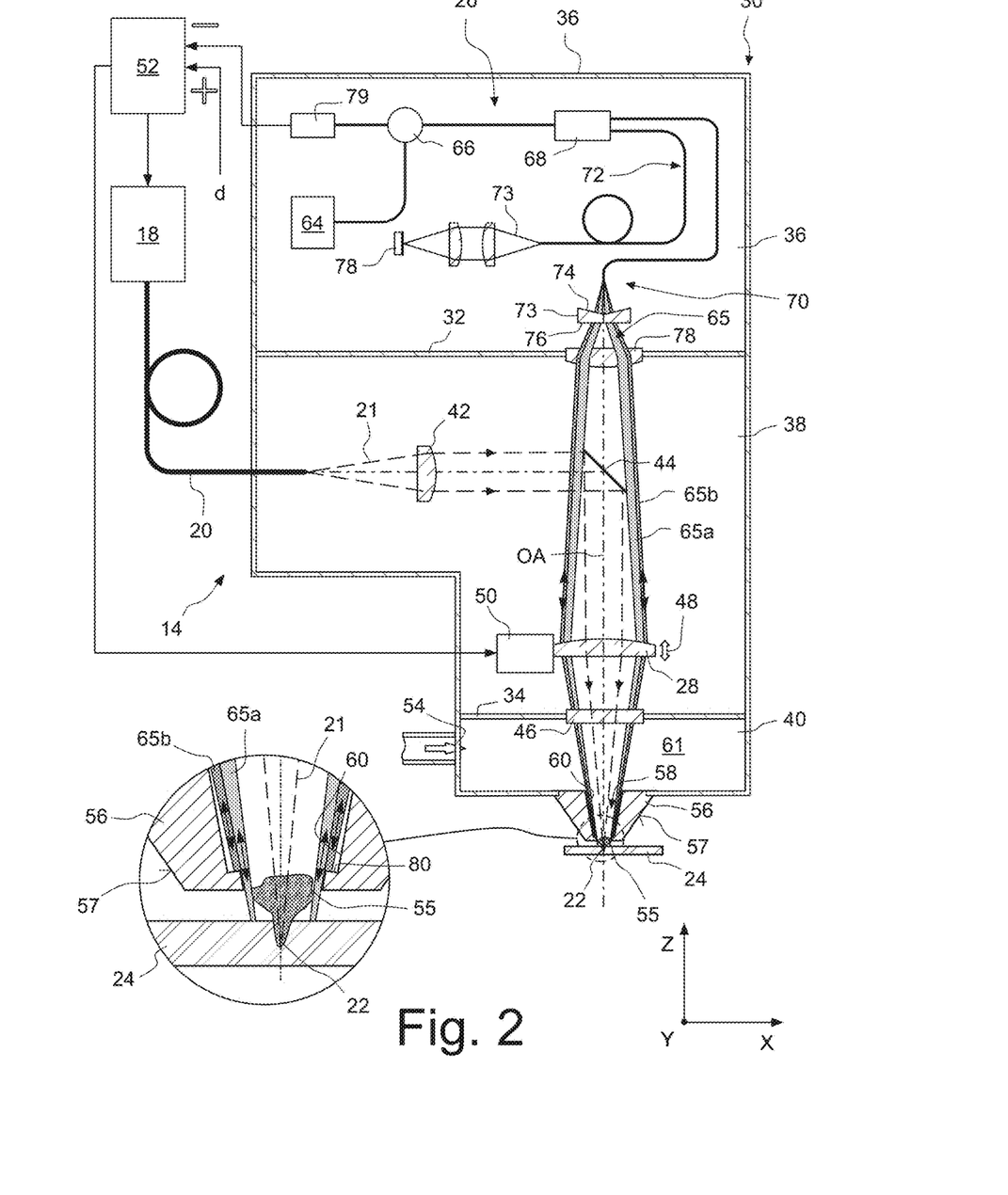
FIG. 2 a meridional section through a machining head of the laser machining apparatus shown in FIG. 1, according to a first embodiment.

FIG. 2 shows the structure of the machining head 14, in a schematic section along the optical axis OA of focussing optics 28, which are represented here with only one lens, but which may also comprise a plurality of lenses or mirrors.

The machining head 14 has a housing 30, which is divided by parturitions 32, 34 into a measuring portion 36, a middle portion 38 and an end portion 40. During the operation of the laser machining apparatus 10, the laser radiation 21 emerges from the end of the optical fibre 20, which is located in the middle portion 38. This laser radiation is collimated by a collimator lens 42 and deflected, via a planar deflection mirror 44, in the direction of the end portion 40. The collimated laser radiation 21 is then incident upon the focussing optics 28, passes through a protective glass 46, which is realized as a plane-parallel plate and embedded in the partition 34, and is finally focussed in the focal spot 22. The axial position of the focal spot 22 along the Z axis can be varied by moving the focussing optics 28, as is indicated in FIG. 2 by a double arrow 48. A positioning drive 50, which is controlled by a control unit 52 of the machining head 14, is provided to move the focussing optics 28.

The end portion 40 of the housing 30, which is separated off from the middle portion 38 by the partition 34 and the protective glass 46, has an inlet opening 54 for a pressurized process gas, which may be, for example, air. The type of process gas used depends on the nature of the laser machining operation and on the material to be machined. In the case of cutting of workpieces from glass-fibre reinforced plastic, the process gas merely performs the function of removing melted-on material from the kerf. In the case of other types of laser machining operations, for instance welding of metals, the process gas may also react chemically with the workpiece.

The process gas emerges from the end portion 40 though an opening 55 in a nozzle 56, which is interchangeably mounted at the lower end of the machining head 14, and through which the laser radiation 21 also emerges. The nozzle 56, which may be made, for example, of copper, has a conical circumferential surface 57 and a likewise conical bore 58, which is concentric with the circumferential surface 57 and which has an inner face 60, as can also be seen in the enlarged detail representation on the left in FIG. 2. The opening angle of the conical bore 58 matches the numerical aperture of the laser radiation 21, such that the laser radiation 21 cannot be incident upon the inner face 60 of the nozzle 56.

The nozzle 56 is part of the end portion 40 of the housing 30. Its bore 58, together with the volume enclosed by the end portion 40, constitutes an interior 61, through which the laser radiation 21 passes.

As can be seen in the enlarged representation on the left in FIG. 2, during the laser machining operation the focussed laser radiation 21 is incident upon the surface of the workpiece 24, and causes the material of the workpiece 24 to melt and partially vaporize. If the focal spot 22 is optimally positioned in relation to the workpiece 24, and the laser radiation 21 is matched, in respect of intensity and wavelength, to the material of the workpiece 24, a smooth cut edge, along which the workpiece 24 is parted through, is produced at the level of the focal spot 22.

During the laser machining operation, in addition to the laser radiation 21, the pressurized process gas, supplied through the inlet opening 54, also emerges from the interior 61, through the bore 58 and the end opening 55 thereof, and is incident upon the surface of the workpiece 24.

Since workpieces such as, for instances, body shells in automobile construction, are generally not planar, but have an irregular three-dimensional form, the distance between the workpiece 24 and the machining head 14 varies continuously during the machining of the workpiece. In order to ensure a constant machining distance, therefore, the machining head 14 must be tracked continuously by the robot 12, not only along the desired kerf, but also in the Z direction perpendicular thereto. In addition or as an alternative to this tracking in the Z direction that is effected by the robot 12, the focussing optics 28 may be moved, in order always to position the focal spot 22 at the optimum height relative to the workpiece 24.

In order for the focal spot 22 always to be optimally positioned in relation to the workpiece 24, by means of the robot 12 and/or the focussing optics 28, the machining head 14 comprises an optical coherence tomograph 26, most of which is accommodated in the measuring portion 36 of the housing 30. The function of the coherence tomograph 26 is to continuously measure the distance of the workpiece 24 in relation to the machining head 14 during the laser machining operation. For this purpose, the coherence tomograph 26 has a broadband light source 64, a first beam splitter 66, and a second beam splitter 68, after which the beam path splits into an object arm 70 and a reference arm 72.

Figure 3:
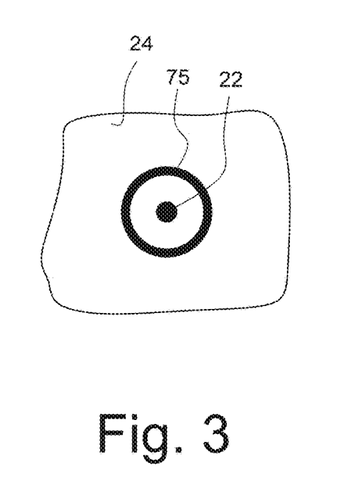
FIG. 3 a top view of the workpiece machined by the laser machining apparatus, wherein the focal spot and a region illuminated by a measuring beam are highlighted.

In the object arm 70, measuring light 65 generated by the light source 64, after emerging from an optical fibre, is directed on to a axicon 71, which has a conical inlet face 7 and a planar outlet face 76. Measuring light 65, emerging in a divergent manner from the fibre of the object arm 70, is deflected outwards by the axicon 71, such that the measuring light 65 widens in the form of a ring after the axicon 71. The measuring light 65 passes through a converging lens 78, passes the outer contour of the deflecting mirror 44, and is ultimately incident upon the focussing optics 28, by which the measuring light 65 is also focussed. In the embodiment represented, the focal plane of the measuring light 65 is further from the machining head 14 than is the focal plane of the laser radiation 21. Since, owing to the passage through the axicon 71, the measuring light 65 passes in the form of a ring through the optical elements arranged after the latter, the region 75 illuminated on the workpiece by the measuring light 65 is also in the form of a ring, as is illustrated by FIG. 3.

At the end of the reference arm 72, the reference light 73, which is initially guided there in an optical fibre, is reflected by a planar mirror 78 coupled back into the optical fibre of the reference arm 72.

The coherence tomograph 26 additionally includes a spectrally resolving light sensor 79, which senses the interference of measuring light 65 that has been reflected from the workpiece 24, by means of the reference light 73, which has traversed a similar optical path distance in the reference arm 72.

In the embodiment represented, the coherence tomograph 26 operates in the frequency domain (FD-OCTM, Fourier Domain Optical Coherence Tomograph). Such coherence tomographs make use of the effect whereby differing path length differences between the object arm 70 and the reference arm 72 produce differing oscillation frequencies in the interference signal. Each layer of a sample can therefore be assigned a particular frequency in the interference signal. Since the light sensor 79 resolves the intensity of the interference signal, the depth information can be deduced, by way of the Fourier transformation, from the spectrally resolved interference signal. Thus, by means of a single FD-OCT measurement, the entire depth profile at a point is obtained, without the necessity of tuning the geometric length of the reference arm or the wavelength of the light source. Since such coherence tomographs 26 are known in the prior art, their function is not explained in greater detail here. Also suitable, in principle, are coherence tomographs having optical circulators, as described in DE 10 2010 016 862 B2.

The light sensor 79 thus generates an output signal, from which the control unit 52 can deduce the actual distance between the machining head 14 and the workpiece 24 from which the measuring light 65 has been reflected. The control unit compares the actual distance with a specified distance d, and controls the positioning drive 50 of the focussing optics 28, by way of a feedback control loop, such that the actual distance approximates as closely as possible to the specified distance d during the entire laser machining operation. Alternatively or additionally, the control unit 52 may also act upon the control system of the robot 12.

As already mentioned, during the laser machining operation the process gas passes through the interior 61, through which the laser radiation 21 and the measuring light 65 also pass. Since the laser machining operation is a dynamic process, in which the conditions in proximity to the surface of the workpiece 24 change continuously, the flow conditions of the process gas also vary as it flows through the interior 61 and ultimately emerges from the opening 55. Even if no turbulence occurs, pressure fluctuations of the process gas in regions of approximately laminar flows are generally unavoidable.

The pressure fluctuations also involve fluctuations of the refractive index of the process gas, and this especially affects the accuracy of the distance measurement. Thus, if the process gas has, for example, a pressure of 5 bar at a first instant and of 1 bar at a second instant, then the distance values measured by the coherence tomograph 26 differ by more than 0.7 mm, if the distance between the protective glass 46 and the opening 55 is about 25 cm. For a high-precision distance measurement, these falsifications of the measured distances, resulting from the pressure fluctuations in the interior 61 are too great to be acceptable.

In order to compensate these falsifications, it is therefore provided, according to the invention, to direct a portion of the measuring light 65, not on to the workpiece 24, but on to a reflective annular face 80 that is located at the lower end of the nozzle 56, in the bore 58. As can be seen in the enlarged representation on the left in FIG. 2, for this purpose the bore 58 is realized as a stepped bore, the step, having the thereby formed reflective annular face 80, being in immediate proximity to the opening 55. The reflective annular face 80 is inclined such that the measuring light 65 incident thereon, which in FIG. 2 is highlighted in bold, is reflected into itself, as indicated by the double arrows. Since the position of the reflective annular face 80 does not alter, the portion of the measuring light 65 that is reflected by it thus directly measures the optical path length differences that are caused by pressure fluctuations in the interior 61. In order to distinguish the portions of the measuring light 65 that are reflected by the workpiece 24 and by the annular face 80, and also to distinguish them from each other in their designations, the portion reflected by the workpiece 24 is also referred to in the following as the object beam 65a, and the proportion reflected by the annular face is also referred to as the measuring beam 65b.

Figure 4:
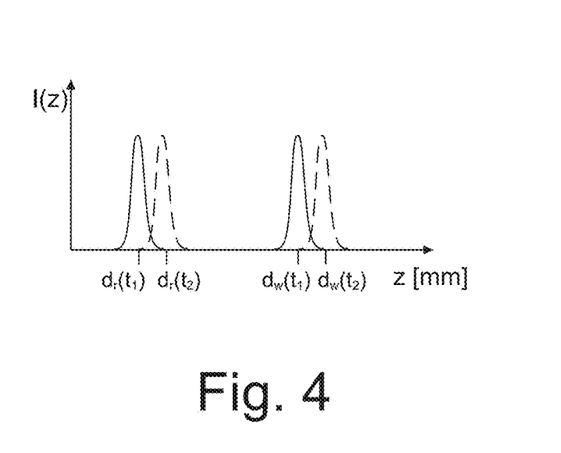
FIG. 4 a graph, in which distance signals generated by a coherence tomograph are plotted.

Shown schematically in FIG. 4 is a graph, in which the distance values, calculated by Fourier transformation from the interference signal by the control unit 52, are represented in a simplified form. It is to be assumed that the object beam 65a, at a first instant $t_1$, measures a distance $d_w(t_1)$, and at a subsequent instant $t_2>t_1$ measures a distance $d_w(t_2)>d_w(t_1)$, although during this time interval the distance between the workpiece 24 and the machining head 14 has remained unchanged. The apparent increase in the distance by $d_w(t_2)-d_w(t_1)$ is due to the increase in pressure in the interior 61.

However, this increase in the pressure is measured by the measuring beam 65b, which is reflected at the stationary annular face 80 in the nozzle 56. The measuring beam 65b thus measures a distance that would always have to remain constant, without pressure fluctuations, because the reflective annular face 80 is stationary. Owing to the pressure increase between the instants $t_1$ and $t_2$, however, the measuring beam 65b is also subjected to an increase in the optical path length, as a result of which the distance measured by it apparently increases from $d_r(t_1)$ to $d_r(t_2)>d_r(t_1)$.

In order to compensate falsifications of the measured workpiece distance $d_w$ that have been caused by pressure fluctuations in the interior 61, it is therefore merely necessary to correct the measured values $d_w$ by those fluctuations that are measured by the measuring beam 65b. The value $d_w'$ for the workpiece distance, compensated by the pressure fluctuations, is thus obtained as $$d_w'(t_2)=d_w(t_2)-[(d_r(t_2)-d_r(t_1)]$$

The thus measured values for the workpiece distance may be used, on the one hand, to track the focussing optics 28, by means of the positioning drive 50, such that the focal spot 22 is located at the desired location on or in the workpiece 24. Alternatively or additionally, the thus measured values may also be used to control the measured distance itself by feedback control. This ensures that the process gas can emerge as evenly as possible from the nozzle 56, and that the removed material is reliably cleared from the kerf by the process gas.

3. Further Embodiments a) Nozzle without stepped bore

Figure 5:
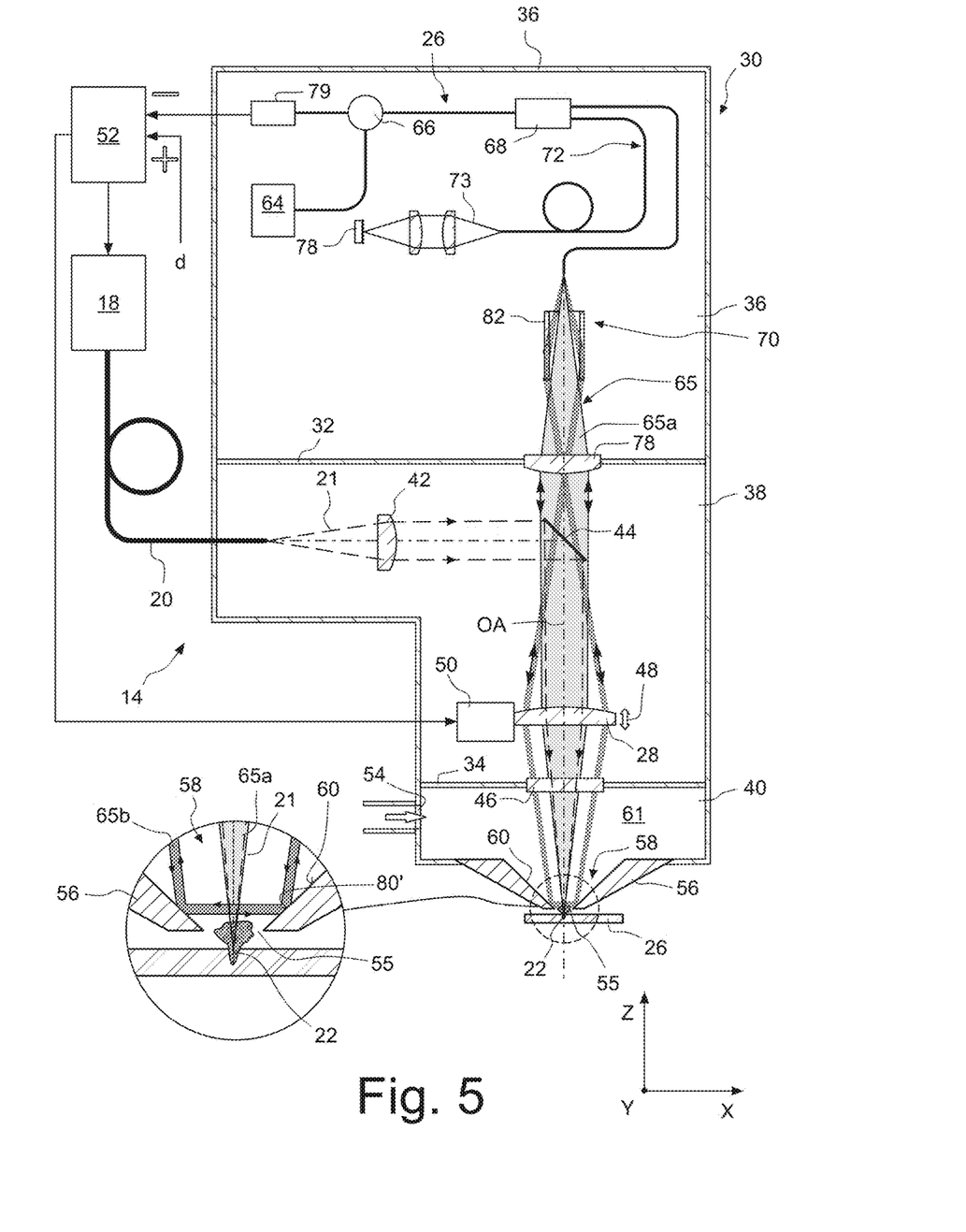
FIG. 5 a meridional section through a machining head according to a second embodiment, in which, instead of an axicon, a hollow cylinder made of glass is provided.

FIG. 5, in a sectional representation based on FIG. 2, shows a machining head 14 according to another embodiment. In this figure, components that are the same or that correspond to each other are denoted by the same reference numerals.

The machining head 14 from FIG. 5 differs from the machining head shown in FIG. 2 substantially in that the axicon 71 has been replaced by a hollow cylinder 82 made of glass (a full cylinder is also a possibility for this). That portion of the measuring light 65 that emerges from the optical fibre of the object arm 70 and passes through the hollow cylinder 82, without having been reflected at its wall, is collimated by the converging lens 78, and focussed by the focussing optics 28 into the focal spot 22 of the laser radiation 21. This portion constitutes an object beam 65a having a circular cross section, which here detects the distance between the workpiece 24 and the machining head 14, not outside of the optical axis OA, but along it.

Since the focal spot 22 is located on the optical axis OA and the workpiece 24 is being parted-off there, the distance values supplied by the object beam 65a are less suited for effecting distance feedback control on the basis thereof. However, an axial measuring point makes it possible to identify whether or not the parting-off of the workpiece 24 by means of the laser radiation 21 has been successful. This is because a successful parting-off is manifested by an abrupt increase in the measured axial distance, or also by an absence of the distance signal.

The portion of the measuring light 65 reflected by total reflection at the wall of the hollow cylinder 82 surrounds, in the shape of a ring, the region of the focussing optics 28 and of the protective glass 46 through which the laser radiation 21 passes, as is also the case, similarly, in the embodiment shown in FIG. 2. This portion constitutes a measuring beam 65b, which, however, as can be seen in the enlarged representation on the left in FIG. 5, is not reflected into itself at a full-perimeter step of the bore 58. Instead, the measuring beam 65b is deflected multiply at the conical inner face 80' of the bore 58, such that the incoming and the outgoing measuring light 65b have a mirror-symmetrical beam path in each meridional plane. As a result, the measuring beam 65b that has been reflected from the inner face 80' of the bore 58 is coupled back into the optical fibre of the object arm 70, jointly with the reflected object beam.

This beam path of the measuring beam 65b has the advantage that the bore 58 in the nozzle 56 need not be provided with a step, but can retain the usual conical shape. Otherwise, however, the measuring principle does not differ from that of the embodiment described in FIGS. 2 to 4.

b) Reference beam passes through interior

Figures 6, 9:
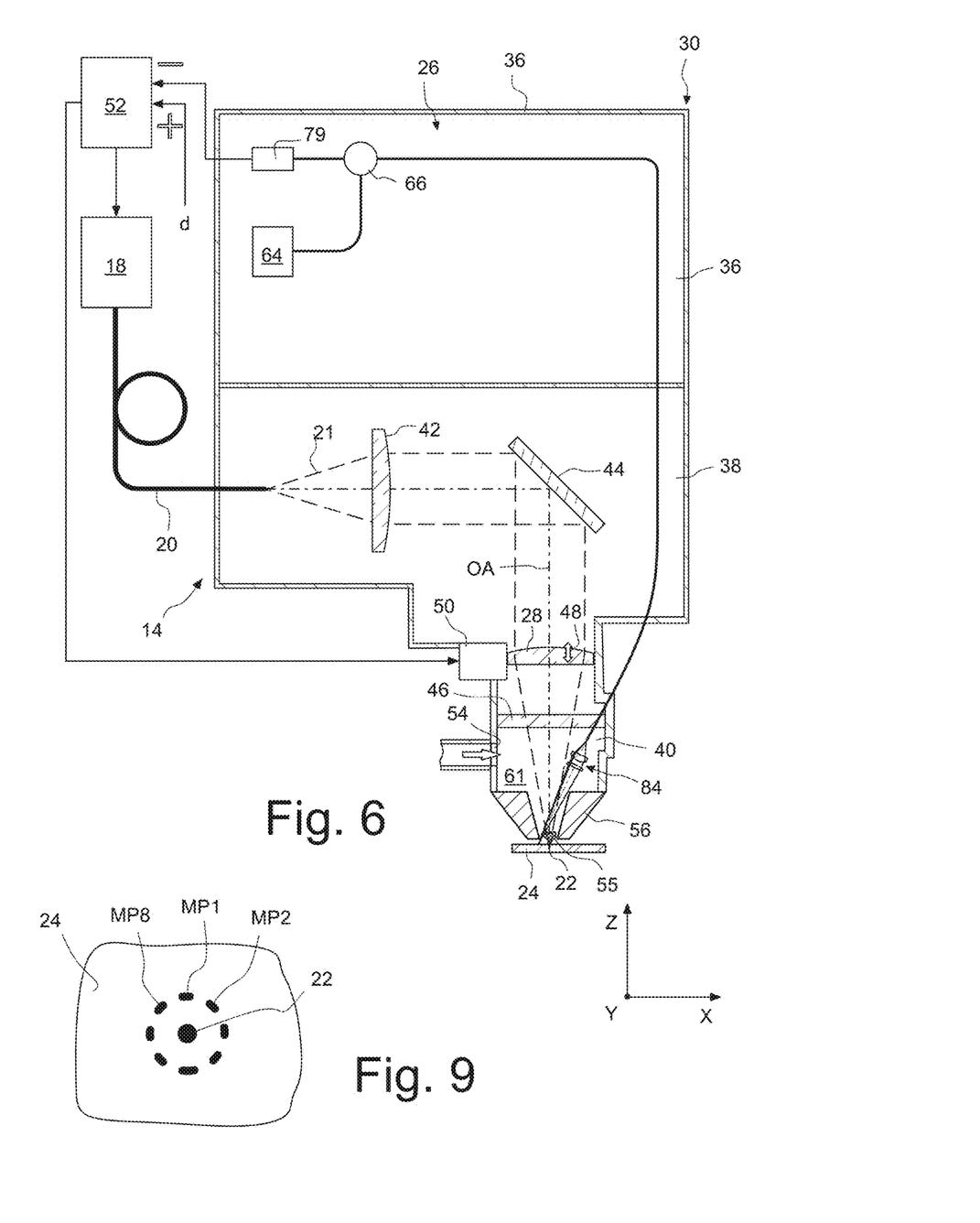
FIG. 6 a meridional section through a machining head according to a third embodiment, in which both the reference light and the measuring beam generated by the coherence tomograph pass through an interior in which pressure fluctuations occur.
FIG. 9 a top view of a workpiece, based on FIG. 2, wherein eight coherence tomographs effect distance measurements, independently of each other, around the focal spot.

FIG. 6 shows a variant of a machining head 14, in which the reference light 73 itself passes through the interior 61, in which the pressure fluctuations result in falsifications of the distance measurement, and thereby constitutes the measuring beam 65b. Moreover, in the case of this embodiment, the measuring light 65 does not pass through any parts of the optics that are located in the light path of the laser radiation 21. Instead, the measuring light 65 is provided with its own measuring-light optics 84, which direct the measuring light 65 on to the workpiece 24 and a reflective face 80" in the nozzle 56.

This is explained in the following with reference to FIG. 7, which is an enlarged representation of the end portion 40 of the housing 30 with the components contained therein. The measuring optics 84 comprise two converging lenses, which focus the light emerging from an optical fibre. The larger portion 65a of the light is focussed on to the face of the workpiece 24, and again constitutes the object beam 65a, which measures the distance in relation to the workpiece 24. A smaller portion of the light, highlighted in bold, constitutes the measuring beam 65b, and simultaneously constitutes the reference light 73. The measuring beam 65b is incident upon a reflective face 80" that is realized, in the form of a small groove, immediately at the opening 55 of the nozzle 56. The measuring beam 65b, together with the object beam 65a, goes back to the light sensor 79 of the coherence tomograph 26 via the measuring-light optics 84.

In the case of this embodiment, therefore, unlike the two embodiments previously described, no additional reference arm is provided. Rather, the reference arm is constituted by the light path between the beam splitter 66 and the reflective face 80". In the light sensor 79 the measuring beam 65b is overlaid directly with the object beam 65a, thereby making it possible to deduce the difference in optical path length that is traversed by the light between the reflective face 80" and the surface of the workpiece 24.

Figure 7:
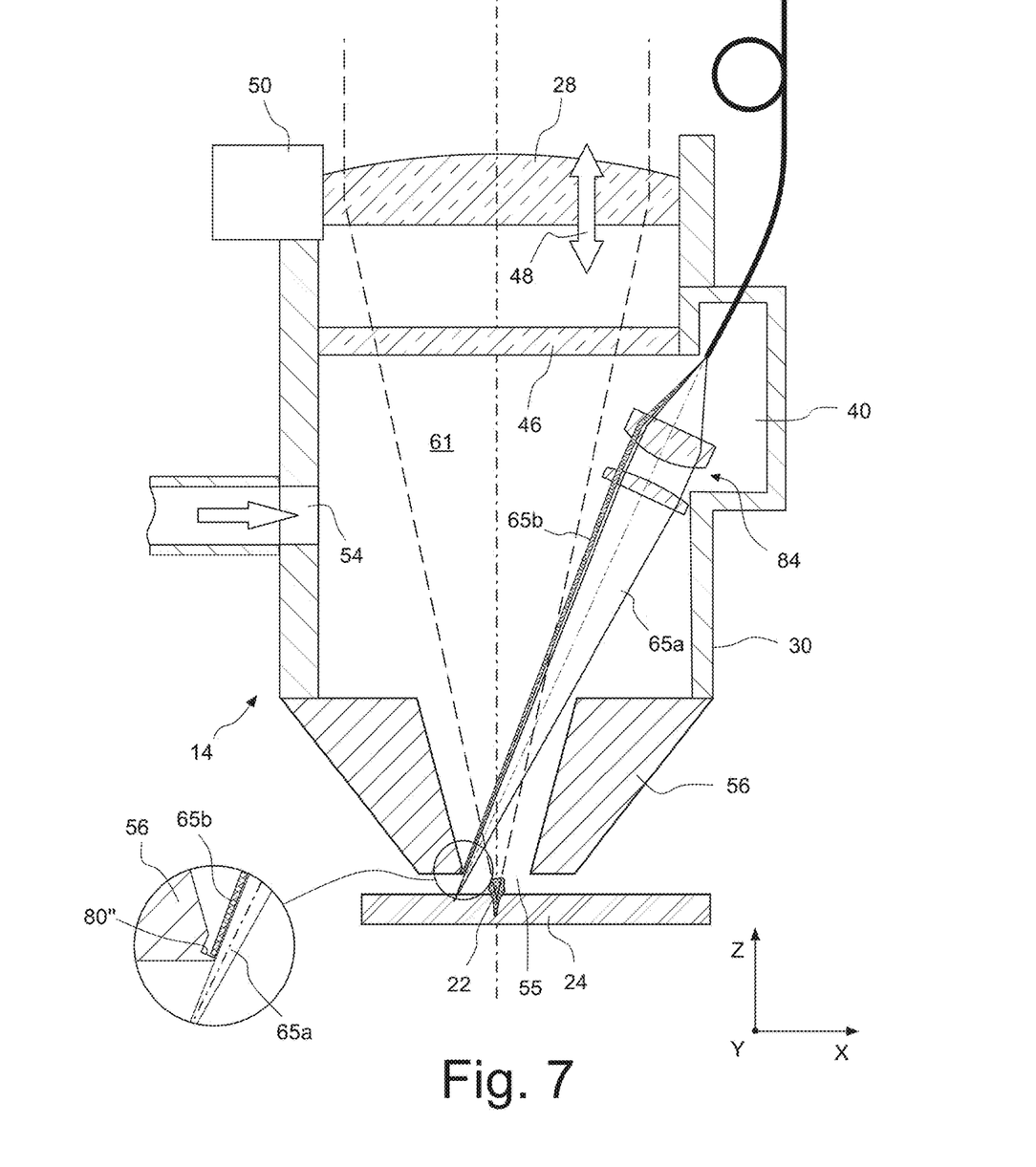
FIG. 7 an enlarged detail section through the end region of the machining head shown in FIG. 6.

Since the measuring beam 65b highlighted in bold in FIG. 7, which simultaneously constitutes the reference light 73, is subjected to practically the same pressure fluctuations as the object beam 65a directed on to the workpiece 24, optical path length differences that are caused by pressure fluctuations in the interior 61 are compensated automatically, since the pressure fluctuations act in the same way upon the measuring beam 65b as upon the object beam 65a.

This variant of the coherence tomograph 26 is expedient, in particular, if a relatively large proportion of the light focussed by the measuring-light optics 84 is reflected at the reflective face 80", and thereby constitutes the reference light of the coherence tomograph. The more similar are the intensities of the light reflected at the reflective face 80" and of the light reflected at the workpiece 24, the more pronounced are the interference phenomena that can be sensed by the light sensor 79.

c) Plurality of measuring beams

Figure 8:
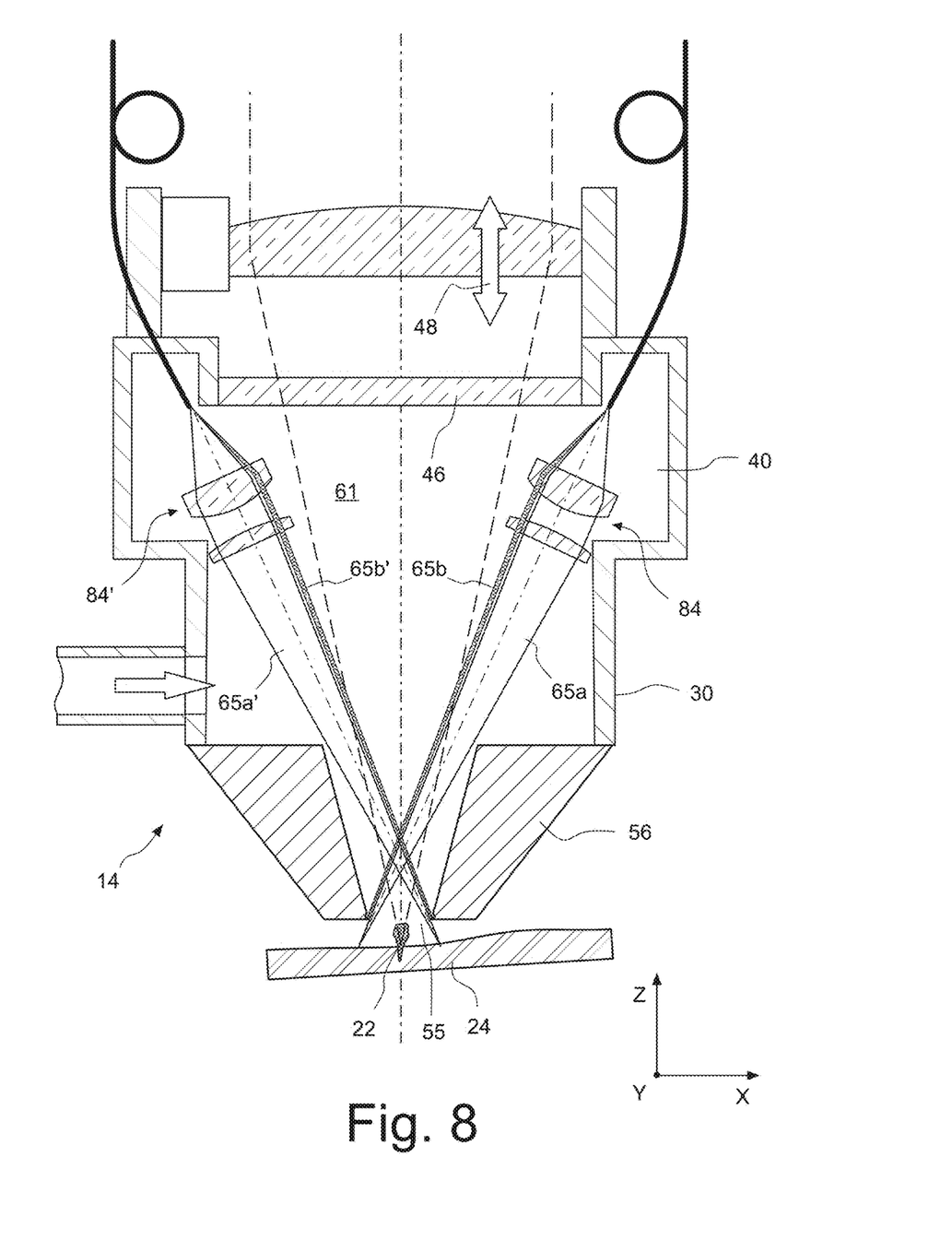
FIG. 8 a representation of a fourth embodiment, based on FIG. 7, in which two coherence tomographs supply independent distance measurement values.

Clearly, measuring light 65 can also be directed on to the surface of the workpiece 24 from differing directions, independently of each other, as illustrated in FIG. 8. In the case of this embodiment, two mutually independent coherence tomographs are provided with measuring-light optics 84, 84', which, by means of object beams 65a, 65a', at a plurality of measurement points on the workpiece 24, measure the distance thereof in relation to the machining head 14, independently of each other. An exemplary arrangement for the case of a total of eight measuring beams is represented schematically in FIG. 9. The measurement points MP1 to MP8 surround the focal spot 22 concentrically, such that even more complex surface geometries of the workpiece 24 can be measured almost completely.

In the case of the embodiment represented in FIG. 8, the coherence tomographs are of a similar design to that of the embodiment represented in FIGS. 6 and 7. The reference arms are therefore each constituted by the optical paths between a beam splitter and a reflective face on the nozzle. Clearly, it is also possible to combine coherence tomographs that are of a design similar to those shown in FIGS. 2 to 4, and that thus each have a reference arm located outside of the interior 61 in which the pressure fluctuations occur.

A plurality of measuring beams can also be generated by means of only one coherence tomograph. For this, it is necessary only to ensure that the measuring beams traverse distinctly differing optical paths to the workpiece. The signals representing the distance are then so far apart from each other that they can always be assigned to a particular measuring beam.

The invention claimed is:

1. A method, comprising the following steps:
   a) providing a machining head of a laser machining apparatus that is configured to machine a workpiece by means of laser radiation, wherein the machining head comprises a housing that has an interior and an opening configured to emit the laser radiation,
   b) directing the laser radiation on the workpiece after the laser radiation has passed through the interior and the opening;
   c) generating an object beam by means of a light source of an optical coherence tomograph, and directing the object beam on the workpiece in such a manner that the object beam passes through the interior and the opening before being incident upon the workpiece;

d) detecting a reflection of the object beam from the workpiece;

e) superimposing the reflection of the object beam with a reference beam generated by the light source of the coherence tomograph;

f) determining the distance between the machining head and the workpiece from an interference signal obtained by the superimposition in step e);

wherein a measuring beam, which passes through the interior in addition to the object beam, is used to compensate falsifications of the measured distance that have been caused by pressure fluctuations in the interior.

2. The method of claim 1, wherein the measuring beam is reflected at a reflective face that is formed on an inner face of the housing of the machining head that delimits the interior.

3. The method of claim 2, wherein the reflective face is formed on the inner face of an outlet nozzle that comprises the opening, and wherein, during the measurement of the distance, a pressurized gas emerges from the opening in addition to the laser radiation and the object beam.

4. The method of claim 1, wherein the measuring beam is likewise generated by the light source of the coherence tomograph, and wherein a reflection of the measuring beam is superimposed with a further beam generated by the light source.

5. The method of claim 4, wherein fluctuations of the optical path length of the measuring beam, which are caused by pressure fluctuations, are determined from a superimposition of the measuring beam with the further beam, and wherein these fluctuations of the optical path length are taken into account in determining the distance in step f).

6. The method of claim 1, wherein the measuring beam is branched off from the object beam.

7. The method of claim 1, wherein the measuring beam is the reference beam of the coherence tomograph.

8. A machining head of a laser machining apparatus that is configured to machine a workpiece by means of laser radiation, said machining head comprising:

a housing, which has
- an inner face delimiting an interior of the machining head, and
- an opening configured to emit the laser radiation from the machining head,
  wherein the interior and the opening are configured such that, during the operation of the laser machining apparatus, the laser radiation passes through the interior, emerges from the opening and is incident on the workpiece, an optical coherence tomograph that is configured to measure a distance between the machining head and the workpiece during the laser machining operation, wherein an object beam of the coherence tomograph likewise passes through the interior, emerges from the opening and is incident on the workpiece during a measurement, a measuring device that is configured to generate a measuring beam, which, in addition to the object beam, passes through the interior and is used to compensate falsifications of the distance measured by the optical coherence tomograph that have been caused by pressure fluctuations in the interior.

9. The machining head of claim 8, comprising a reflective face on the inner face of the housing, wherein the reflective face is configured to reflect the measuring beam.

10. The machining head of claim 8, wherein the reflective face is formed on an inner face of an outlet nozzle that comprises the opening, and wherein the interior has an inlet opening for a pressurized gas, which, in addition to the laser radiation and the object beam, emerges from the opening during the measurement of the distance.

11. The machining head of claim 8, wherein the measuring device is the coherence tomograph, and wherein a light source of the coherence tomograph is configured to generate the measuring beam, and wherein the coherence tomograph comprises a detector that is configured to detect a superimposition of a reflection of the measuring beam with a further beam that is generated by the light source.

12. The machining head of claim 11, wherein the measuring device comprises a computing unit that is configured to determine, from the superimposition of the measuring beam with the further beam, fluctuations of the optical path length of the measuring beam that have been caused by pressure fluctuations, and wherein these fluctuations of the optical path length are taken into account by the computing unit in determining the distance.

13. The machining head of claim 8, wherein the measuring beam is branched off from the object beam.

14. The machining head of claim 8, wherein the measuring beam is a reference beam of the coherence tomograph.

15. The machining head of claim 8, wherein the measuring device is configured to direct a plurality of object beams on differing regions on the workpiece.

* * * * *

UNITED STATES PATENT AND TRADEMARK OFFICE
CERTIFICATE OF CORRECTION

PATENT NO. : 9,770,783 B2  
APPLICATION NO. : 14/814892  
DATED : September 26, 2017  
INVENTOR(S) : Martin Schoenleber Page 1 of 1

It is certified that error appears in the above-identified patent and that said Letters Patent is hereby corrected as shown below:

On the Title Page

Column 1 Item (74) Line 10 Attorney, Agent, or Firm - "Sutherland" should be replaced with -- Summerfield --.

Signed and Sealed this
First Day of May, 2018

Andrei Iancu
*Director of the United States Patent and Trademark Office*